E. EMMERT.
Corn-Planter.
No. 212,669. Patented Feb. 25, 1879.
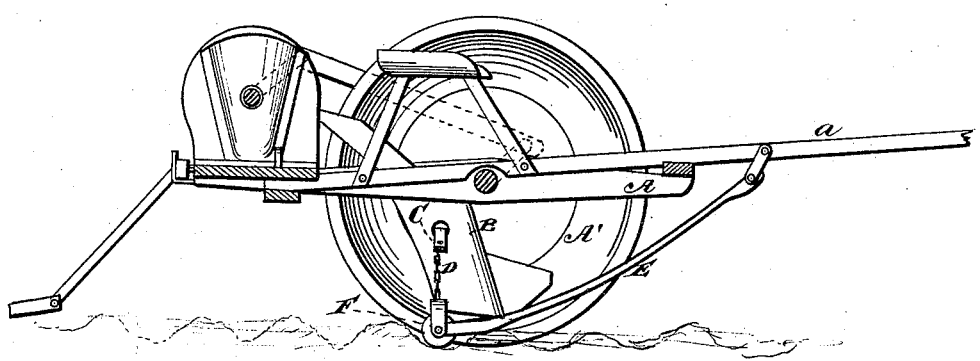
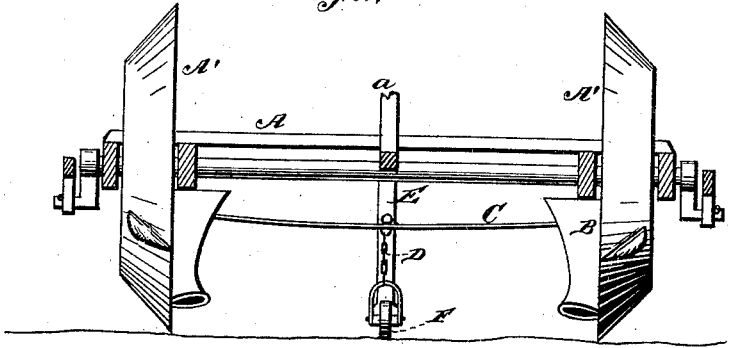

UNITED STATES PATENT OFFICE.

EZRA EMMERT, OF DIXON, ILLINOIS.

IMPROVEMENT IN CORN-PLANTERS.

Specification forming part of Letters Patent No. 212,669, dated February 25, 1879; application filed December 14, 1878.

*To all whom it may concern:*

Be it known that I, EZRA EMMERT, of Dixon, in the county of Lee and State of Illinois, have invented a new and valuable Improvement in Corn-Planters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal central section of my corn-planter, and Fig. 2 is a sectional view of the same.

My invention relates to a machine for planting corn or other seeds; and the novelty consists in the construction and arrangement of parts, as will be more fully hereinafter set forth.

The object of the invention is to automatically drop the seed in the cross-furrow.

In carrying out my invention I employ a spring-bar, each end of which operates in the conductor of or passage through the seed-tube. A chain or the like from the center of the spring-bar connects with a weighted lever carrying a roller. This lever is loosely pivoted forward, and as it drops by its weight into the cross-furrow it immediately acts upon the spring-bar, which allows the seed to drop into that furrow simultaneously.

Referring to the drawings, A represents the frame; A', the wheels; a, the tongue, and B the seed-tube, having suitable valves operated by a spring-bar, C, as shown. The seed comes from suitable hoppers having vibrating feed mechanism.

A chain, D, from the center of the spring-bar C connects with a weighted lever, E, in which is properly journaled a roller or wheel, F. The lever is pivoted to the tongue a, and the roller F is, when in use, on a line between the lower ends of the seed-tubes.

When the roller drops into one of the cross-furrows, the chain depresses the center of the spring-bar, and this action operates proper valves in the conductor, and allows the seed to drop into the said furrow. When the roller rides above the furrow the spring-bar arises and the valves are closed.

What I claim as new, and desire to secure by Letters Patent, is—

The spring-bar C, chain D, pivoted lever E, and roller F, combined with the feed mechanism of a corn-planter, as and for the purpose set forth.

In testimony that I claim the above I have hereunto subscribed my name in the presence of two witnesses

EZRA EMMERT.

Witnesses:
   J. C. AYERS,
   WM. H. GODFREY.